(12) United States Patent
Lin et al.

(10) Patent No.: US 12,535,693 B2
(45) Date of Patent: Jan. 27, 2026

(54) CONTACT LENSES

(71) Applicant: Unicon Optical Co., LTD., Hsinchu County (TW)

(72) Inventors: Ming-Cheng Lin, Hsinchu County (TW); Hsien-Sheng Liao, Hsinchu County (TW); Wen-Chi Yang, Taichung (TW)

(73) Assignee: UNICON OPTICAL CO., LTD., Hsinchu County (TW)

( * ) Notice: Subject to any disclaimer, the term of this patent is extended or adjusted under 35 U.S.C. 154(b) by 350 days.

(21) Appl. No.: 18/324,595

(22) Filed: May 26, 2023

(65) Prior Publication Data

US 2024/0393616 A1 Nov. 28, 2024

(51) Int. Cl.
*G02C 7/04* (2006.01)

(52) U.S. Cl.
CPC .................... *G02C 7/041* (2013.01)

(58) Field of Classification Search
CPC .......... G02C 7/041; G02C 7/04; G02C 7/024; G02C 2202/24
See application file for complete search history.

(56) References Cited

U.S. PATENT DOCUMENTS

| 6,520,637 | B2 | 2/2003 | Hodur et al. |
| 2010/0073629 | A1* | 3/2010 | Menezes ................ G02C 7/044 |
| | | | 351/159.12 |
| 2019/0219839 | A1 | 7/2019 | Ho et al. |
| 2019/0227342 | A1 | 7/2019 | Brennan et al. |
| 2022/0197060 | A1 | 6/2022 | Chamberlain et al. |

* cited by examiner

*Primary Examiner* — Tuyen Tra
(74) *Attorney, Agent, or Firm* — MUNCY, GEISSLER, OLDS & LOWE, P.C.

(57) ABSTRACT

A contact lens includes a first optical region, a second optical region, and a transition region. The first optical region is shaped to form a first power profile. The second optical region is shaped to form a second power profile. The transition region is joined between the first optical region and the second optical region and is shaped to form a third power profile with a power variation radially changing from the first power profile to the second power profile as a radius increasing. The transition region includes a first subzone, a second subzone and a third subzone. Each of the first subzone and the third subzone has a gradual power variation measured from a lens center to a lens edge as compared to the second subzone, and the second subzone has a steep power variation measured from the lens center to the lens edge.

8 Claims, 7 Drawing Sheets

CONTACT LENSES

FIELD OF THE INVENTION

The present disclosure relates to a contact lens, and more particularly to a peripheral defocus contact lens with controlled optical power profile to balance abrupt power variation between the central and the peripheral regions.

BACKGROUND OF THE INVENTION

Contact lenses are widely used to correct defects in vision, such as myopia, hyperopia, astigmatism, presbyopia, etc. Conventional contact lenses provide a vision-correcting curvature only in an optical region at the center of a lens so that the image focus is moved to the retina to correct the vision, and a peripheral region around the first optical region is used to support the lens to fit the shape of a user's eyeball.

While lenses with a peripheral region with an add-power offset relative to the central region of the lens have been demonstrated to suppress myopia progression for some wearers. However, this kind of multizonal lens may cause symptoms such as headache, dizziness and peripheral blurry.

SUMMARY OF THE INVENTION

The present disclosure generally relates to a peripheral defocus contact lens.

The contact lens includes a first optical region, a second optical region and a transition region. The first optical region is in a central region of the contact lens, the first optical region is shaped to form a first power profile with a negative power. The second optical region surrounds the first optical region, the second optical region is shaped to form a second power profile with a positive power relative to the first optical region. The transition region joins between the first optical region and the second optical region, the transition region is shaped to form a third power profile with a power variation radially changing from the first power profile to the second power profile as a radius increasing. The transition region includes a first subzone joining to the first optical region, a second subzone joining to the first subzone and a third subzone joined between the second subzone and the second optical region, each of the first subzone and the third subzone has a gradual power variation measured from a lens center to a lens edge as compared to the second subzone, and the second subzone has a steep power variation measured from the lens center to the lens edge.

DETAILED DESCRIPTION OF THE PREFERRED

Embodiments

The present disclosure provides a contact lens to prevent or slow progression of myopia, hyperopia or presbyopia with improved comfort. As used herein, the term "contact lens" refers to an ophthalmic lens that can be placed onto the anterior surface of a person's eye. It will be appreciated that such a contact lens will provide clinically acceptable on-eye movement and not bind to the person's eye. The contact lens may be in the form of a corneal lens (e.g., a lens that rests on the cornea of the eye). The contact lens may be a soft contact lens, such as a hydrogel contact lens or a silicone hydrogel contact lens.

Terms used herein are merely based on illustration of specific embodiments and are not intended to limit the present disclosure. As used herein, the singular forms "a", "an", and "the" include the plural forms as well, unless the context clearly indicates otherwise. Detailed description and technical content of the present disclosure are described below with reference to the drawings. The terms "Diopter" or "D" as used herein is the unit measure of dioptric power, defined as the reciprocal of the focal distance of a lens, in meters, along an optical axis.

Figure 1:
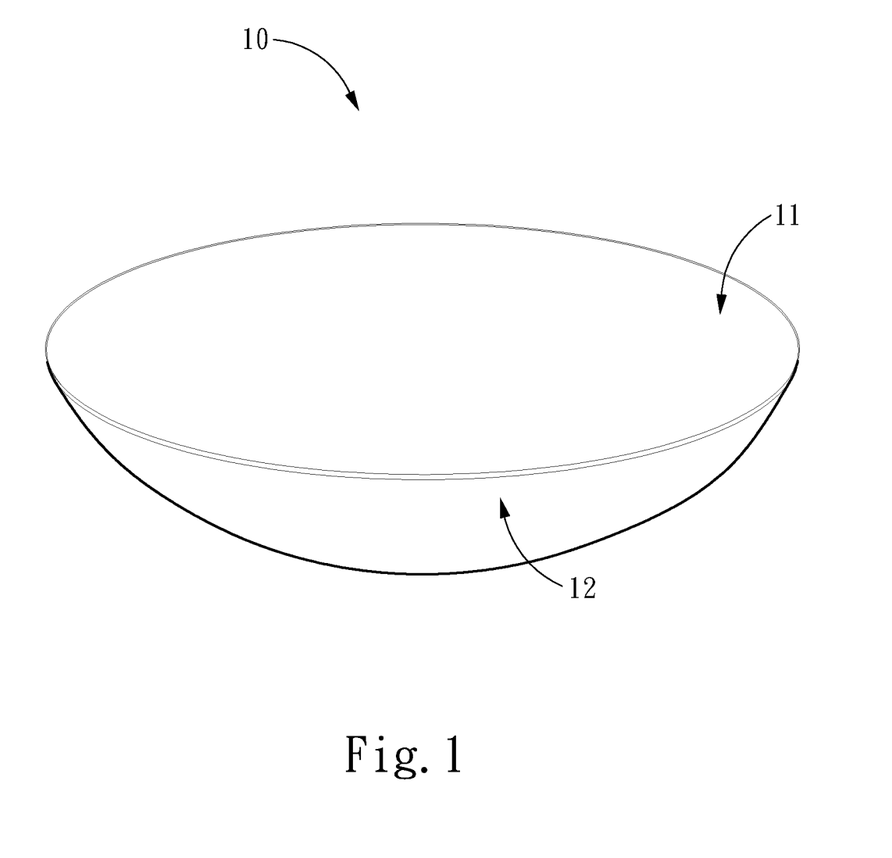
FIG. 1 is a perspective view of a contact lens of the present disclosure.

Referring to FIG. 1, a perspective view of a contact lens of the present disclosure is shown. The present disclosure provides a contact lens 10 which includes an inner side surface (a back surface) 11 and an outer surface (a front surface) 12. The inner side surface 11 attaches to a wearer's eye when the contact lens 10 is worn, which may have a posterior surface radius of curvature. It may be desirable that the posterior surface radius of curvature is varied within a specific range with a diameter or a radius of the contact lens 10, to conform the shape of the wearer's eye. In some cases, it may be desirable that the posterior surface radius of curvature is constant over entirety of the contact lens 10 surfaces. The outer surface 12 is located at a side opposite to the inner side surface 11 and includes a plurality of regions with different anterior surface curvatures to achieve one or more controlled optical power profiles for desired vision correction and provide a multifocal contact lens. The posterior surface radius of curvature and the anterior surface curvatures may be symmetric about an axis of the contact lens 10. The optical power profiles in different zones or regions may be symmetric.

A curvature providing an add power may be a curvature of the anterior surface (the outer surface 12) of the contact lens 10. Alternatively, a curvature providing an add power may be a curvature of the posterior surface (the inner side surface 11) of the contact lens 10. Further, a curvature providing an add power may be a curvature of the anterior surface and the posterior surface of the contact lens 10 providing a combined effect.

Figure 2:
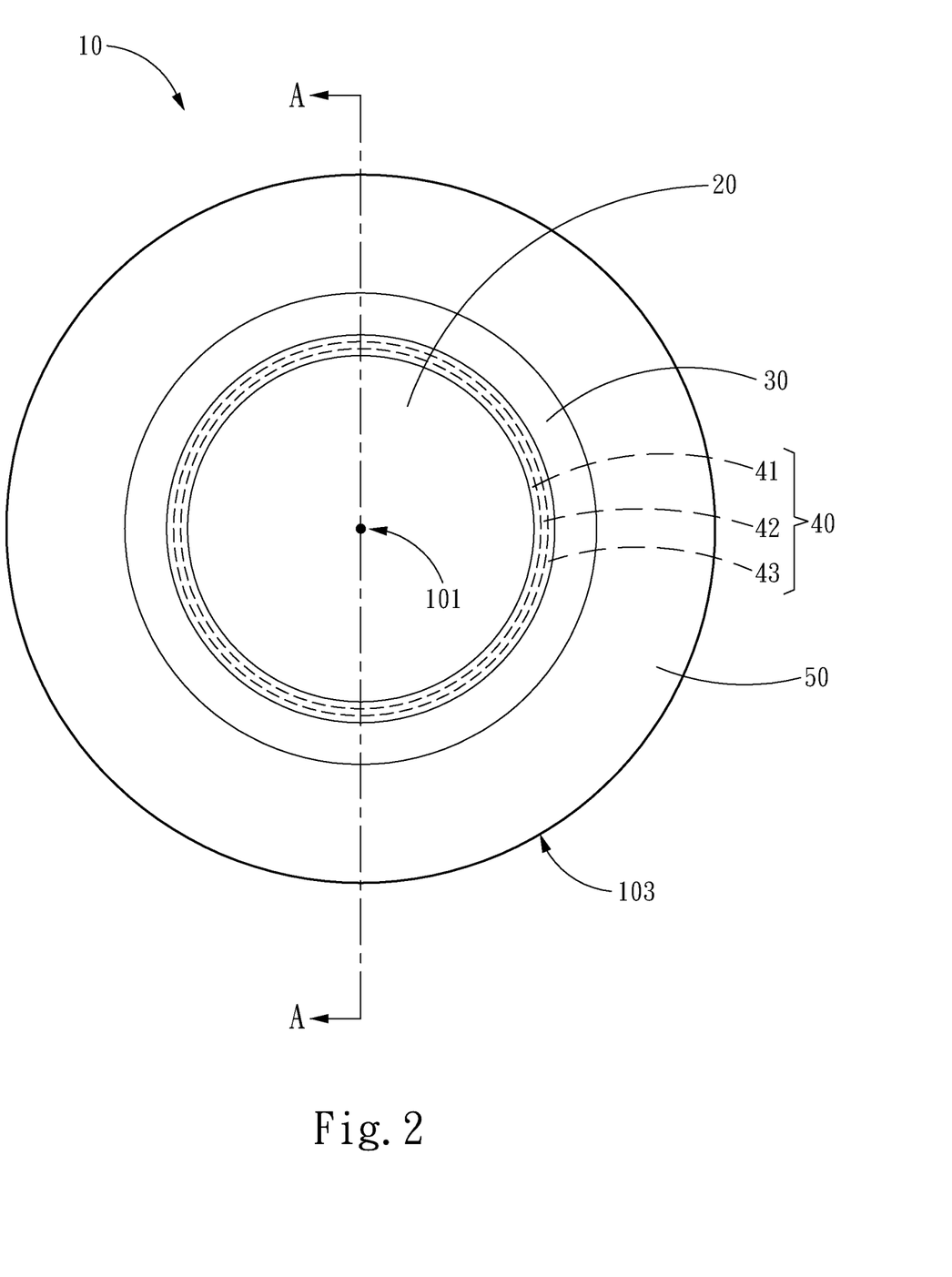
FIG. 2 is a plan view of a contact lens according to a first embodiment of the present disclosure.
Figure 3:
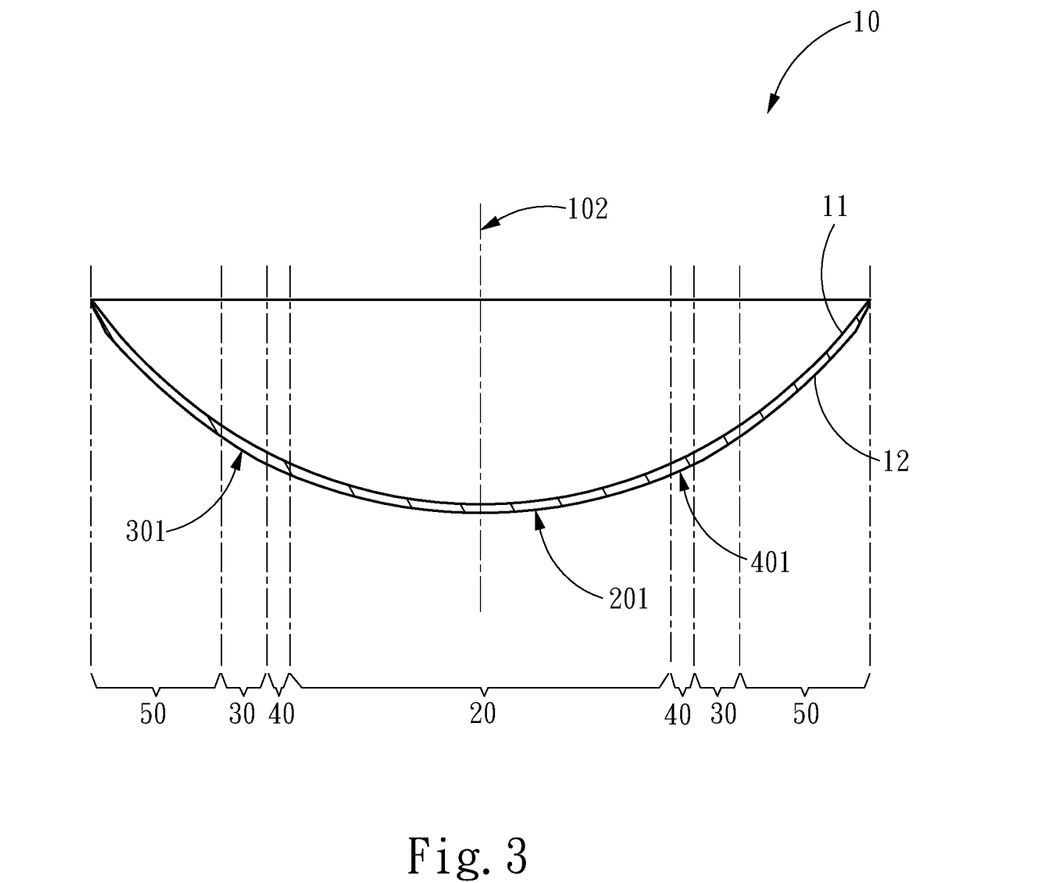
FIG. 3 is a cross-section view of the lens of FIG. 2 taken along line A-A of FIG. 2.

Referring to FIGS. 2 and 3, the contact lens 10 includes a first optical region 20, one or more second optical regions 30, one or more transition regions 40, and a marginal region 50. In an example, the first optical region 20, the second optical region 30, the transition region 40, and the marginal region 50 are positioned concentrically at various radii from a center axis 102 and have a shared center 101. The center 101 may be a geometrical center or an optical center of the contact lens 10. In an example, the geometrical center of the contact lens 10 may coincide with the optical center of the contact lens 10. The second optical region 30, the transition region 40, and the marginal region 50 are provided around an entire circumference of the contact lens 10.

The first optical region 20 is provided in a central zone of the contact lens 10 and with a substantially circular conical shape. In the following context of the present disclosure, the first optical region 20 is configured to correct myopia of a wearer. In other examples, the first optical region 20 may be configured to correct other vision problems such as hyperopia, presbyopia and astigmatism, by a suitable radius of curvature which is capable to achieve an optical power, also known as dioptric power or correction power. The first optical region 20 is present on the outer surface 12 with a contour 201, which may have a radius of curvature ranging from 7.05 millimeters (mm) to 12.05 mm.

The second optical region 30 is provided in a peripheral zone and surrounds the first optical region 20 by concentric circle, and is present on the outer surface 12 with a contour 301, which may have a radius of curvature ranging from 6.8 mm to 11.0 mm. The second optical region 30 is configured to create myopic defocus relative to the first optical region 20 for myopia control, by providing relatively more positive power (or add power) than the first optical region 20. In other examples, the second optical region 30 may be configured to provide hyperopic defocus. In an alternative example, the second optical region 30 may provide relatively less negative power (or add power) than the first optical region 20.

The transition region 40 is provided in an annular zone between the first optical region 20 and the second optical region 30, and is present on the outer surface 12 with a contour 401, which may have a radius of curvature ranging from 6.5 mm to 10.5 mm. The marginal region 50 is provided radially extending outwards from the second optical region 30 and in an annular configuration. In some other examples, the regions 20, 30, 40 may be present on one and/or both the inner side surface 11 and the outer surface 12.

Given that different radii of curvature of the first optical region 20 and the second optical region 30 of the contact lens 10, different diopter powers are provided. Through differences between the diopter power of the first optical region 20 and a defocus power (also known as defocus diopter) of the second optical region 30, a peripheral defocus is created in front of the retina of the wearer, and the elongation of the eyeball may be slowed down in the anterior and posterior directions, thus controlling myopia progression. In the example, the first optical region 20 has a negative power and the second optical region 30 has a positive power, which are defined by a first power profile and a second power profile, respectively. The second optical region 30 has a more positive power than the first optical region 20 and the first power profile and the second power profile are substantially constant powers with increasing radius.

Alternatively, such a contact lens is suitable for a wearer with both myopia and/or presbyopia. The first optical region 20 is configured to achieve the first optical power profile for correcting myopia and the second optical region 30 is configured to achieve the second optical power profile for correcting presbyopia (or providing myopic defocus) such that the wearer may switch between two different types of corrections quickly and also maintain clear vision when looking either at near objects or distant objects.

Figure 4:
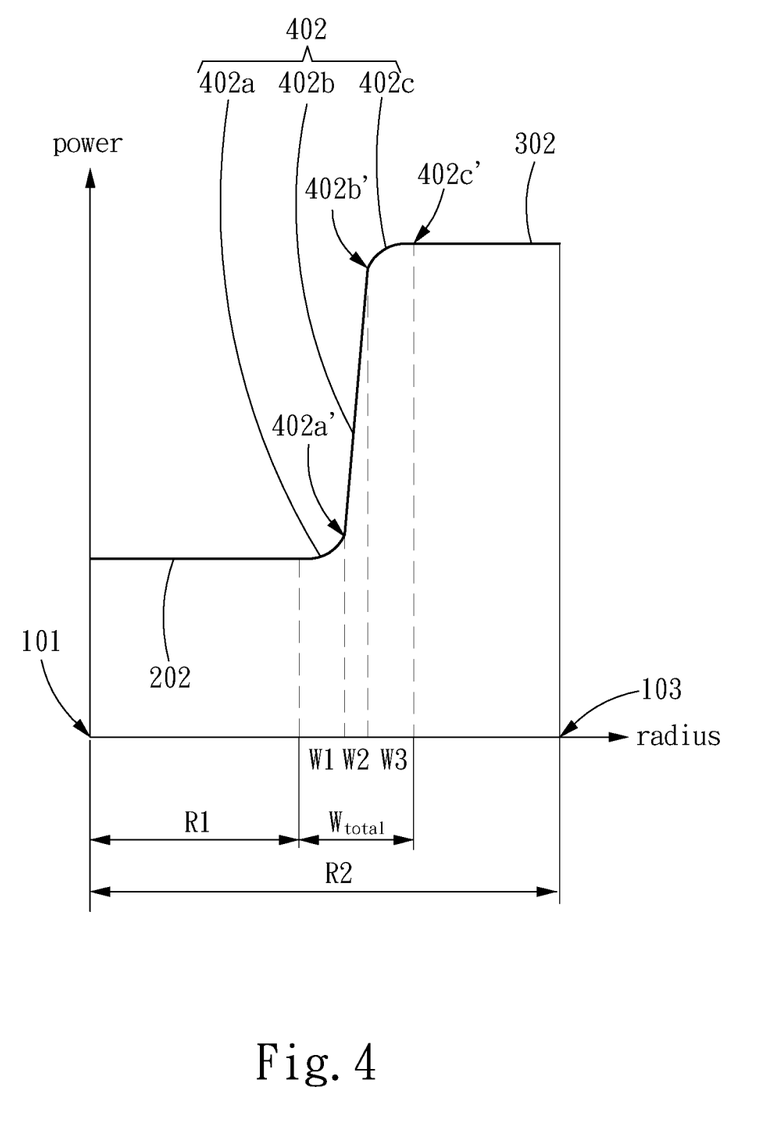
FIG. 4 illustrates the power profile as the function of the radial distance from the center of the contact lens in accordance with the first embodiment of the present disclosure.

FIG. 4 illustrates power profiles as a function of radial distance from the center of the contact lens 10, in the first embodiment of the present disclosure, where the radius of curvature of the first optical region 20 is designed to achieve the first power profile as represented by line 202, the radius of curvature of the second optical region 30 is designed to achieve the second power profile as represented by line 302 and the radius of curvature of the transition region 40 is designed to achieve a third power profile as represented by line 402. The first power profile 202 is determined based on a desired first vision correction, such as a dioptric correction. For example, the desired vision correction may be myopia correction, hyperopia correction or presbyopia correction. The second power profile 302 is determined based on a desired second vision correction. In a first aspect, the second vision correction is to prevent myopia progression or myopia control by imposing peripheral defocus. In a second aspect, the second vision correction is presbyopia correction.

In this embodiment, the first power profile 202 of first optical region 20 may be a constant or substantial constant value in a range between −10.00 D and −0.50 D (between −1000 degrees and −50 degrees), a power difference between the first optical region 20 and the second optical region 30 may be a constant or substantial constant value in a range between 2.00 D and 5.00 D (between 200 degrees and 500 degrees), and the second power profile 302 of the second optical region 30 is more positive than the first optical region 20. The power profiles of the first optical region 20 and the second optical region 30 each have a respective substantially constant power with increasing radius.

In an example, the first optical region 20 has a radius R1 ranging between 1.1 mm and 1.6 mm, the second optical region 30 has a radius R2 less than 4 mm, which are measured from the center 101 of the contact lens 10 in a radial direction (from the lens center 101 to a lens edge 103). The transition region 40 has an annular ring width as denoted as $W_{total}$ in FIG. 4 (namely, a minimum distance between boundaries of the first optical region 20 and the second optical region 30) ranges between 0.1 mm and 1 mm, which is measured in the radial direction.

In certain examples, the transition region 40 is not used for vision correction. The transition region 40 may include one or more annular subzones. As shown in FIG. 2, the transition region 40 includes a first subzone 41, a second subzone 42 and a third subzone 43 which are shaped to achieve the third power profile as defined by a curve 402 in FIG. 4. The third power profile 402 increases as a function of radial position across the transition region 40. The third power profile 402 is divided into three sections corresponding to the first subzone 41, the second subzone 42 and the third subzone 43, which are a first subzone power profile 402a, a second subzone power profile 402b and a third subzone power profile 402c. The first subzone 41 is joined to the first optical region 20 and the optical power of the first subzone 41 increases gradually from the optical power at a boundary of the first optical region 20 to a higher value denoted as 402a'. The optical power of the first subzone 41 exhibits a moderate transition and the first subzone 41 has a progressive (increasing) power profile, which is a curved or a curvilinear power profile.

The second subzone 42 is joined to the first subzone 41 and the optical power of the second subzone 42 increases rapidly from the optical power of 402a' to a higher value denoted as 402b'. The optical power of the second subzone 42 exhibits an abrupt transition and the second subzone 42 has a substantially linear power profile with a radial slope value higher than the first subzone 41.

The third subzone 43 is similar to the first subzone 41. The third subzone 43 is joined between the second subzone 42 and the second optical region 30. The optical power of the third subzone 43 increases gradually from the optical power at the boundary of the second subzone 42 to a higher value denoted as 402c'. The optical power of the third subzone 43 exhibits a moderate transition and the third subzone 43 has a progressive (increasing) power profile, which is a curved or a curvilinear power profile.

The first subzone 41 has a first rate of change in power/radius, the second subzone 42 has a second rate of change in power/radius, and the third subzone 43 has a third rate of change in power/radius, the second rate of change is larger than either of the first rate of change or the third rate of change.

In an example, the dimension and the power design are satisfied the following relationships, such that the first subzone 41 and the third subzone 43 are capable of alleviating a sudden change from the optical power of the first optical region 20 to the optical power of the second optical region 30 and also balance abrupt power variation of the second subzone 42.

$$35\% \leq \frac{W1}{W_{total}} \leq 45\%$$

$$15\% \leq \frac{W2}{W_{total}} \leq 25\%$$

$$35\% \leq \frac{W3}{W_{total}} \leq 45\%$$

$$8.3\% \leq \frac{\Delta P1}{\Delta P_{total}} \leq 25\%$$

$$58.3\% \leq \frac{\Delta P2}{\Delta P_{total}} \leq 75\%$$

$$8.3\% \leq \frac{\Delta P3}{\Delta P_{total}} \leq 25\%$$

W1, W2 and W3 respectively denote an annular width of the first subzone 41, the second subzone 42 and the third subzone 43, $W_{total}$ denotes an annular width of the transition region 40. In an example, the total width $W_{total}$ is in a range between 0.3 mm and 1.4 mm. W1 may be equal or close to W3.

In an example, $$\frac{W1}{W_{total}} = 40\% \pm 2\%, \frac{W2}{W_{total}} = 20\% \pm 2\%$$

$$\frac{W3}{W_{total}} = 40\% \pm 2\%, \frac{\Delta P1}{\Delta P_{total}} = 16.67\% \pm 1.5\%,$$

$$\frac{\Delta P2}{\Delta P_{total}} = 66.67\% \pm 1.5\%, \text{ and } \frac{\Delta P3}{\Delta P_{total}} = 16.67\% \pm 1.5\%.$$

ΔP1, ΔP2 and ΔP3 represent a power variation (or difference) in the first subzone 41, the second subzone 42 and the third subzone 43 along a radius direction as the radius increasing, respectively. $\Delta P_{total}$ represents a total power variation (or difference) in the transition region 40 along the radius direction as the radius increasing.

In the example of FIG. 4, the optical power of the first subzone 41 gradually increases with increasing radius. The optical power of the first subzone 41 varied between 0.45 D and 1.0 D (between 45 and 100 degrees). The optical power of the second subzone 42 is a ramp increasing with increasing radius. The optical power of the second subzone 42 varied between 1.2 D and 3.7 D (between 120 and 370 degrees). The optical power of the third subzone 43 gradually increases with increasing radius. The optical power of the third subzone 43 varied between 0.45 D and 1.0 D (between 45 and 100 degrees). The slope of line 402b is more positive (or larger) than both of the slopes of lines 402a, 402c.

Figure 5:
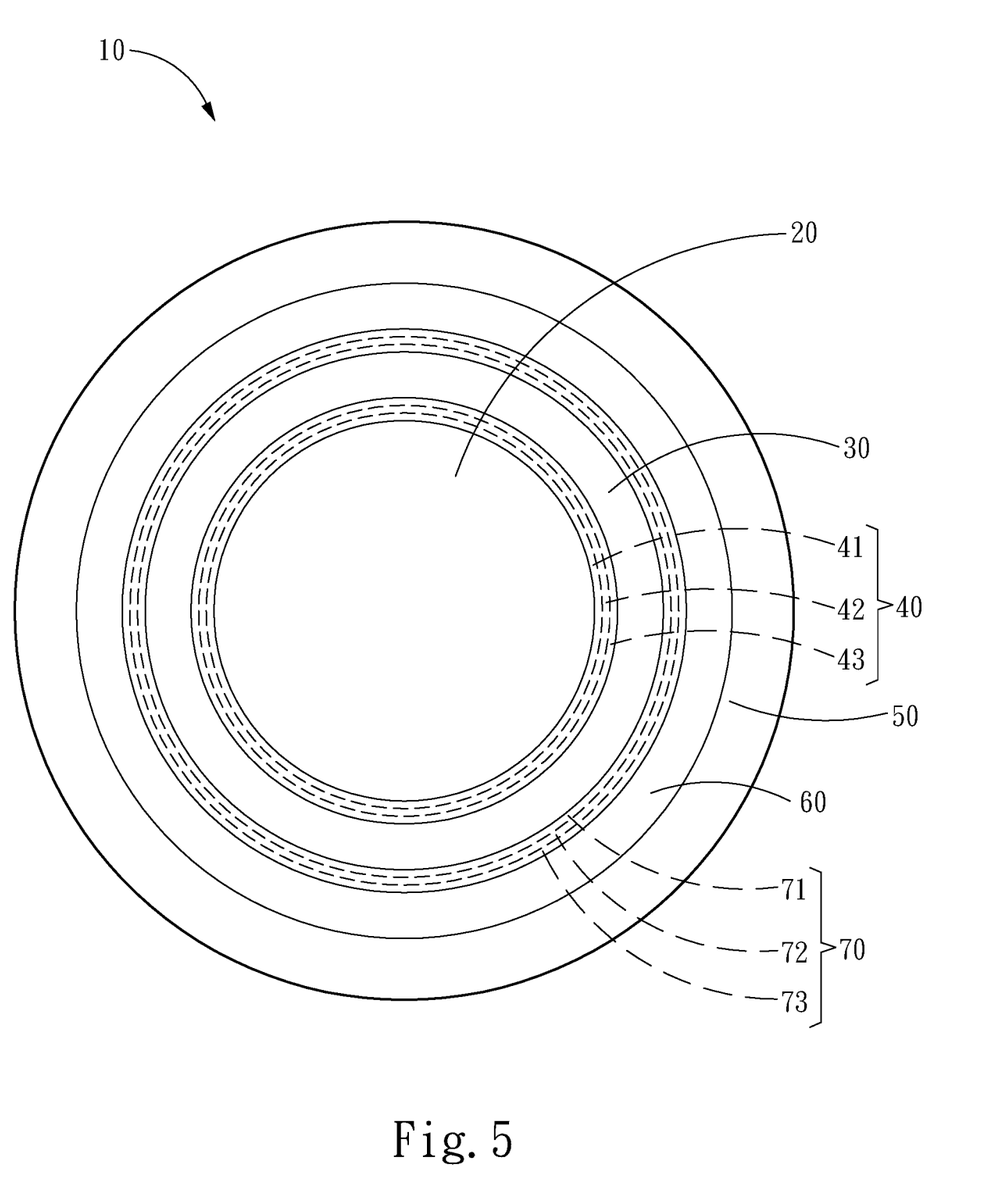
FIG. 5 is a plan view of a contact lens according to a second embodiment of the present disclosure.
Figure 6:
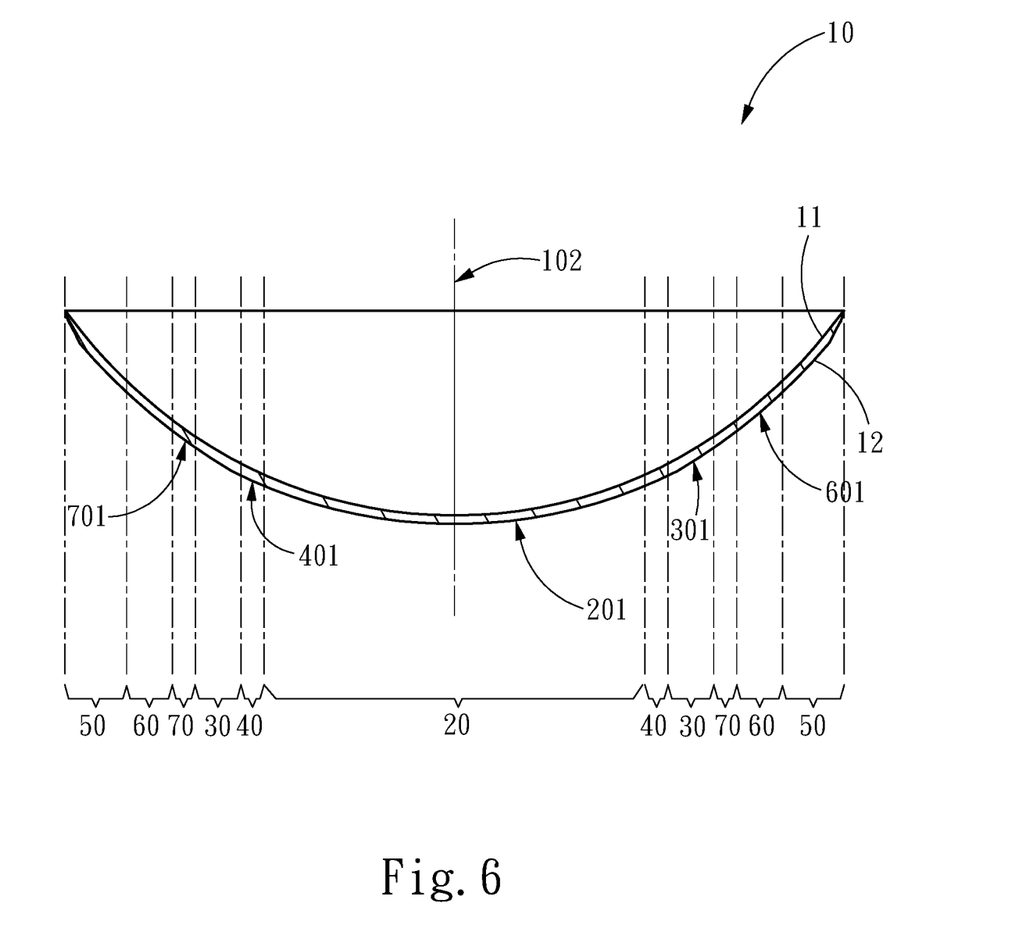
FIG. 6 is a cross-section view of the lens of FIG. 5 taken along line B-B of FIG. 5.

FIGS. 5 and 6 are a plan view and a cross-section view of a contact lens according to a second embodiment of the present disclosure, respectively. The contact lens 10 includes a first optical region 20, a second optical region 30, a third optical region 60, a first transition region 40, a second transition region 70, and a marginal region 50. The first optical region 20, the second optical region 30, the third optical region 60, the first transition region 40, the second transition region 70, and the marginal region 50 are formed as an integrated and continuous structure. The features of the first optical region 20, the second optical region 30, the first transition region 40 and the marginal region 50 are the same as described in the first embodiment with reference to FIGS. 1, 2, 3, and 4.

In the second embodiment, the third optical region 60 and the second transition region 70 are introduced compared to the first embodiment. The third optical region 60 surrounds the second optical region 30, and is present on the outer surface 12 with to a contour 601 with a radius of curvature ranging from 7.05 mm to 12.05 mm. The second transition region 70 is provided in an annular zone between the second optical region 30 and the third optical region 60, and is present on the outer surface 12 with a contour 701 with a radius of curvature ranging from 6.5 mm to 10.5 mm.

Figure 7:
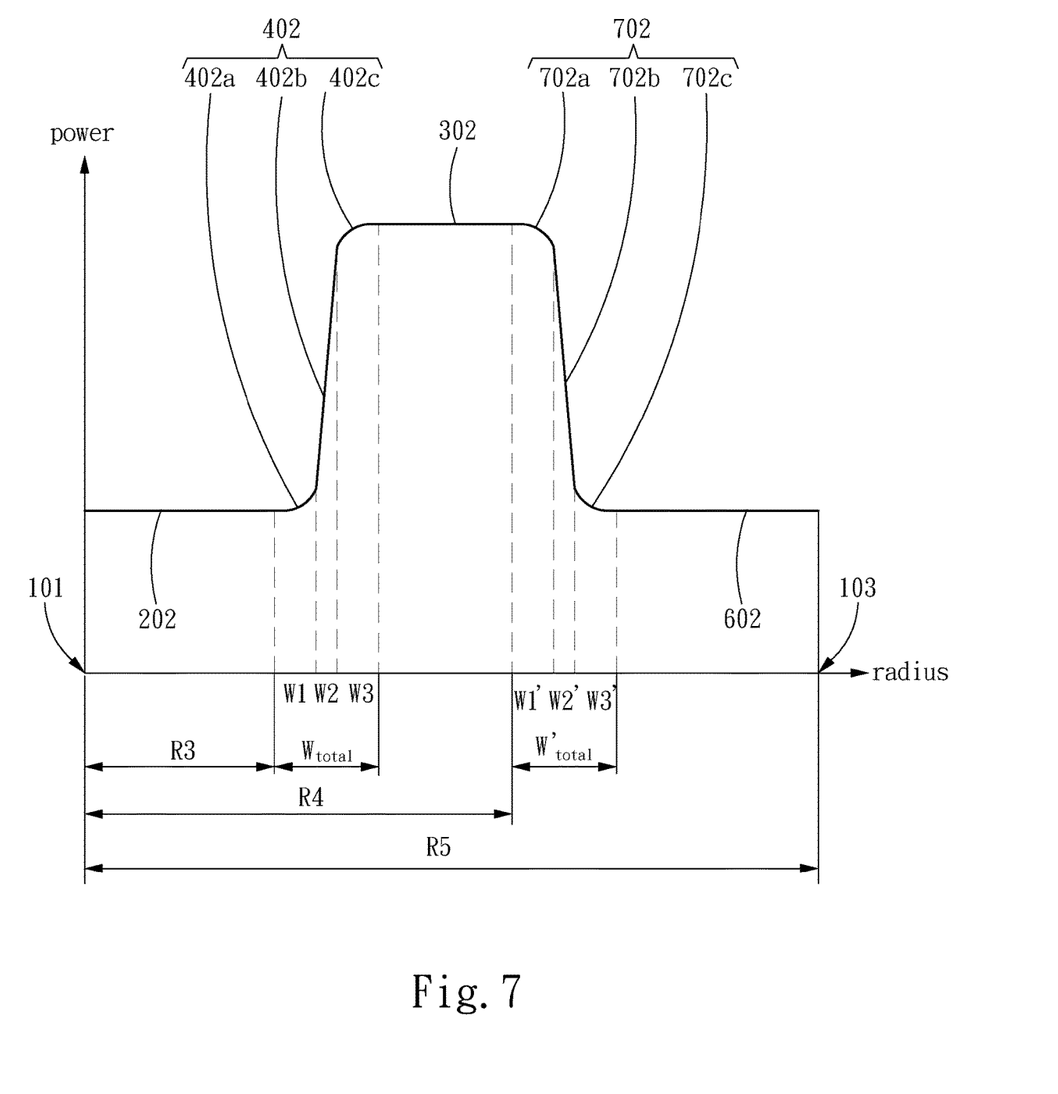
FIG. 7 illustrates the power profile as the function of the radial distance from the center of the contact lens in accordance with the second embodiment of the present disclosure.

FIG. 7 illustrates power profiles as a function of radial distance from the center 101 of the contact lens 10, in the second embodiment of the present disclosure, where the radius of curvature of the third optical region 60 is designed to achieve a fourth power profile as represented by line 602 and the radius of curvature of the second transition region 70 is designed to achieve a fifth power profiles as represented by line 702. The line 602 may be determined based on a desired additional vision correction.

In this embodiment, the fourth power profile of third optical region 60 may be a constant or substantial constant value in a range between −10.00 D and −0.50 D (between −1000 degrees and −50 degrees), which is more negative than the second power profile of the second optical region 30. The power difference between the second optical region 30 and the third optical region 60 may range between 2.00 D and 5.00 D (between 200 degrees and 500 degrees). The third optical region 60 has a substantially constant power with increasing radius.

In certain examples, the second transition region 70 is not used for vision correction. The second transition region 70 may include one or more annular subzones. As shown in FIG. 5, the second transition region 70 includes a first subzone 71, a second subzone 72 and a third subzone 73 which are shaped to achieve the fifth power profile as defined by the curve 702 in FIG. 7. Similar to the third power profile 402, the fifth power profile 702 is divided into three sections corresponding to the subzones 71, 72, 73, which are the subzone power profiles 702a, 702b, 702c. The subzone 71 is joined to the second optical region 30 and the optical power of the subzone 71 decreases gradually from the optical power at a boundary of the second optical region 30 to a lower value. The optical power of the subzone 71 exhibits a moderate transition and the subzone 71 has a progressive (decreasing) power profile, which is a curved or a curvilinear power profile.

The subzone 72 is joined to the subzone 71 and the optical power of the subzone 72 decreases rapidly from the subzone power profiles 702a to a lower value. The optical power of the subzone 72 exhibits an abrupt transition and the subzone 72 has a substantially linear power profile with a radial slope value smaller than the subzone 71 (or more negative than the subzone 71).

The subzone 73 is similar to the subzone 71. The subzone 73 is joined between the subzone 72 and the third optical region 60. The optical power of the subzone 73 decreases gradually from the optical power at the boundary of the subzone 72 to a lower value. The optical power of the subzone 73 exhibits a moderate transition and the subzone 73 has a progressive (decreasing) power profile, which is a curved or a curvilinear power profile.

In an example, the dimension and the power design are satisfied the following relationships:

$$35\% \leq \frac{W1'}{W'_{total}} \leq 45\%$$

$$15\% \leq \frac{W2'}{W'_{total}} \leq 25\%$$

$$35\% \leq \frac{W3'}{W'_{total}} \leq 45\%$$

$$8.3\% \leq \frac{\Delta P1'}{\Delta P'_{total}} \leq 25\%$$

$$58.3\% \leq \frac{\Delta P2'}{\Delta P'_{total}} \leq 75\%$$

$$8.3\% \leq \frac{\Delta P3'}{\Delta P'_{total}} \leq 25\%$$

W1', W2' and W3' respectively denote an annular width of the subzone 71, 72, 73, $W'_{total}$ denotes an annular width of the second transition region 70. In an example, the total width $W'_{total}$ is in a range between 0.3 mm and 1.4 mm. W1' may be equal or close to W3', and the annular widths $W_{total}$ and $W'_{total}$ are close or equal.

ΔP1', ΔP2' and ΔP3' represent a power variation (or difference) in the first subzone 71, the second subzone 72 and the third subzone 73, as shown in FIG. 5, along a radius direction as the radius increasing, respectively. $\Delta P'_{total}$ represents a total power variation (or difference) in the second transition region 70 along the radius direction as the radius increasing.

In the example of FIG. 7, the optical power of the subzone 71 gradually decreases with increasing radius. The optical power of the subzone 71 varied between 0.45 D and 1.0 D (between 45 and 100 degrees). The optical power of the subzone 72 is a ramp decreasing with increasing radius. The optical power of the subzone 72 varied between 1.2 D and 3.7 D (between 120 and 370 degrees). The optical power of the subzone 73 gradually decreases with increasing radius. The optical power of the subzone 73 varied between 0.45 D and 1.0 D (between 45 and 100 degrees). The slope of line 702b is more negative (or smaller) than both of the slopes of lines 702a, 702c.

In an example, the first optical region 20 has a radius R3 ranging between 1.1 mm and 1.6 mm, the second optical region 30 has a radius R4 ranging between 1.2 mm and 3.5 mm, the third optical region 60 has a radius R5 less than 4 mm, which are measured from the center 101 of the contact lens 10 in the radial direction. The first transition region 40 has a annular ring width $W_{total}$ ranges between 0.3 mm to 1.4 mm, which is measured in the radial direction. The second transition region 70 has a annular ring width $W'_{total}$ ranges between 0.3 mm to 1.4 mm, which is measured in the radial direction.

By combining different radii of curvature of the multiple optical regions on one contact lens, a multifocal contact lens is provided. For example, the first optical region is for correcting myopia and the second optical region is for correcting presbyopia, such that the wearer may switch between two different types of corrections quickly and also maintain clear vision when looking at near or distant objects.

The first subzone and the third subzone are provided to alleviate a change from the optical power of the first optical region to the optical power of the second optical region and also balance abrupt power variation of the second subzone, when the wearer's eye orients from the first optical region to the second optical region. As a result, the headache, dizziness and peripheral blurry of the wearer could be improved.

Even though reference has been made to a specific embodiment or example of the present disclosure, it is obvious for a person skilled in the art that the lens described herein are susceptible to numerous variations and modifications, and that all of the details mentioned can be substituted for other technically equivalent ones without departing from the scope of protection defined by the attached claims.

What is claimed is:

1. A contact lens, comprising:
  a first optical region located in a central region of the contact lens, the first optical region being shaped to form a first power profile with a negative power;
  a second optical region surrounding the first optical region, the second optical region being shaped to form a second power profile with a positive power relative to the first optical region; and
  a transition region joined between the first optical region and the second optical region, the transition region being shaped to form a third power profile with a power variation radially changing from the first power profile to the second power profile as a radius increasing, wherein the transition region comprises a first subzone joining to the first optical region, a second subzone joining to the first subzone and a third subzone joined between the second subzone and the second optical region, each of the first subzone and the third subzone has a gradual power variation measured from a lens center to a lens edge as compared to the second subzone, and the second subzone has a steep power variation measured from the lens center to the lens edge;
  wherein the first subzone, the second subzone and the third subzone satisfy the following relationships:

$$35\% \leq \frac{W1}{W_{total}} \leq 45\%$$

$$15\% \leq \frac{W2}{W_{total}} \leq 25\%$$

$$35\% \leq \frac{W3}{W_{total}} \leq 45\%$$

$$8.3\% \leq \frac{\Delta P1}{\Delta P_{total}} \leq 25\%$$

$$58.3\% \leq \frac{\Delta P2}{\Delta P_{total}} \leq 75\%$$

-continued $$8.3\% \leq \frac{\Delta P3}{\Delta P_{total}} \leq 25\%$$

wherein W1, W2 and W3 represent an annular ring width of the first subzone, the second subzone and the third subzone, respectively, Wtotal represents an annular ring width of the transition region, $\Delta P1$, $\Delta P2$ and $\Delta P3$ represent the power variation of the first subzone, the second subzone and the third subzone along a radius direction as the radius increasing, respectively, and $\Delta P_{total}$ represents a total power variation of the transition region along the radius direction as the radius increasing; and wherein the annular ring width of the transition region ranges from 0.3 mm to 1.4 mm.

2. The contact lens of claim 1, wherein the first subzone has a first subzone power profile with a curvilinear or curve ramp configuration, the second subzone has a second subzone power profile with a sloped ramp configuration, and the third subzone has a third subzone power profile with a curvilinear or curve ramp configuration.

3. The contact lens of claim 1, wherein the first power profile and the second power profile are substantially constant powers with increasing radius, respectively.

4. The contact lens of claim 1, wherein the first optical region is shaped to have a first radius of curvature ranging from 7.05 mm (millimeters) to 12.05 mm on an outer surface of the contact lens.

5. The contact lens of claim 1, wherein the second optical region is shaped to have a second radius of curvature ranging from 6.8 mm to 11.0 mm on an outer surface of the contact lens.

6. The contact lens of claim 1, wherein the transition region is shaped to have a third radius of curvature ranging from 6.5 mm to 10.5 mm on an outer surface of the contact lens.

7. The contact lens of claim 1, wherein each of the first subzone, the second subzone and the third subzone provides a progressively increasing power as the subzones extend radially outwardly, wherein the power variation of the second subzone is greater than the power variations of the first subzone and the third subzone.

8. The contact lens of claim 1, wherein the first subzone has a first rate of change in power/radius, the second subzone has a second rate of change in power/radius, and the third subzone has a third rate of change in power/radius, wherein the second rate of change is larger than either of the first rate of change or the third rate of change.

* * * * *